(12) United States Patent
Allirot

(10) Patent No.: US 6,731,500 B2
(45) Date of Patent: May 4, 2004

(54) DESKTOP COMPUTER APPLIANCE

(75) Inventor: Richard Allirot, Corenc (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/782,720

(22) Filed: Feb. 13, 2001

(65) Prior Publication Data

US 2001/0014008 A1 Aug. 16, 2001

(30) Foreign Application Priority Data

Feb. 14, 2000 (EP) ............................................ 00410013

(51) Int. Cl.⁷ ................................................. G06F 1/16
(52) U.S. Cl. ........................ 361/685; 361/686; 361/731
(58) Field of Search ................................ 361/685, 686; 439/133, 135, 304 R, 368 R, 373, 374

(56) References Cited

U.S. PATENT DOCUMENTS

| | | | | |
|---|---|---|---|---|
| 4,898,009 A | * | 2/1990 | Lakoski et al. | 439/133 |
| 4,937,806 A | * | 6/1990 | Babson et al. | 360/137 |
| 5,446,622 A | | 8/1995 | Landry et al. | 361/757 |
| 5,572,402 A | * | 11/1996 | Jeong | 361/685 |
| 5,837,942 A | | 11/1998 | Becker | 174/135 |
| 6,108,199 A | * | 8/2000 | Bonardi et al. | 361/686 |

FOREIGN PATENT DOCUMENTS

| | | | |
|---|---|---|---|
| DE | 295 17 244 U1 | 10/1995 | ............ G06F/1/16 |
| EP | 0 387 011 | 9/1990 | |
| GB | 2 299 735 | 10/1996 | |
| WO | 97/23818 | 7/1997 | |
| WO | WO 98/30986 | 1/1998 | ............ G07G/1/00 |

OTHER PUBLICATIONS

"HP D6655B and HP D6659A: Master Pass Key System: User's Guide," Hewlett–Packard Specification, p. 1–12.

* cited by examiner

*Primary Examiner*—Darren Schuberg
*Assistant Examiner*—Anthony Q. Edwards

(57) ABSTRACT

A desktop personal computer appliance is described for use with external user input and display devices, the appliance consisting of: a system unit having a sealed housing comprising main processing functionality for executing application programs and at least a DC—DC converter, the housing being provided with external connectors for connection to said external user input and display devices; a removable data storage device for storing user data associated with said application programs and a user-specific software image containing said application programs, the housing having a recessed portion for receiving the removable data storage device and a movable closure member for enclosing the recessed portion; and an external power supply having a flying lead connectable to an external socket provided in the housing for supplying DC power to the DC—DC converter.

16 Claims, 5 Drawing Sheets

Figure 1:
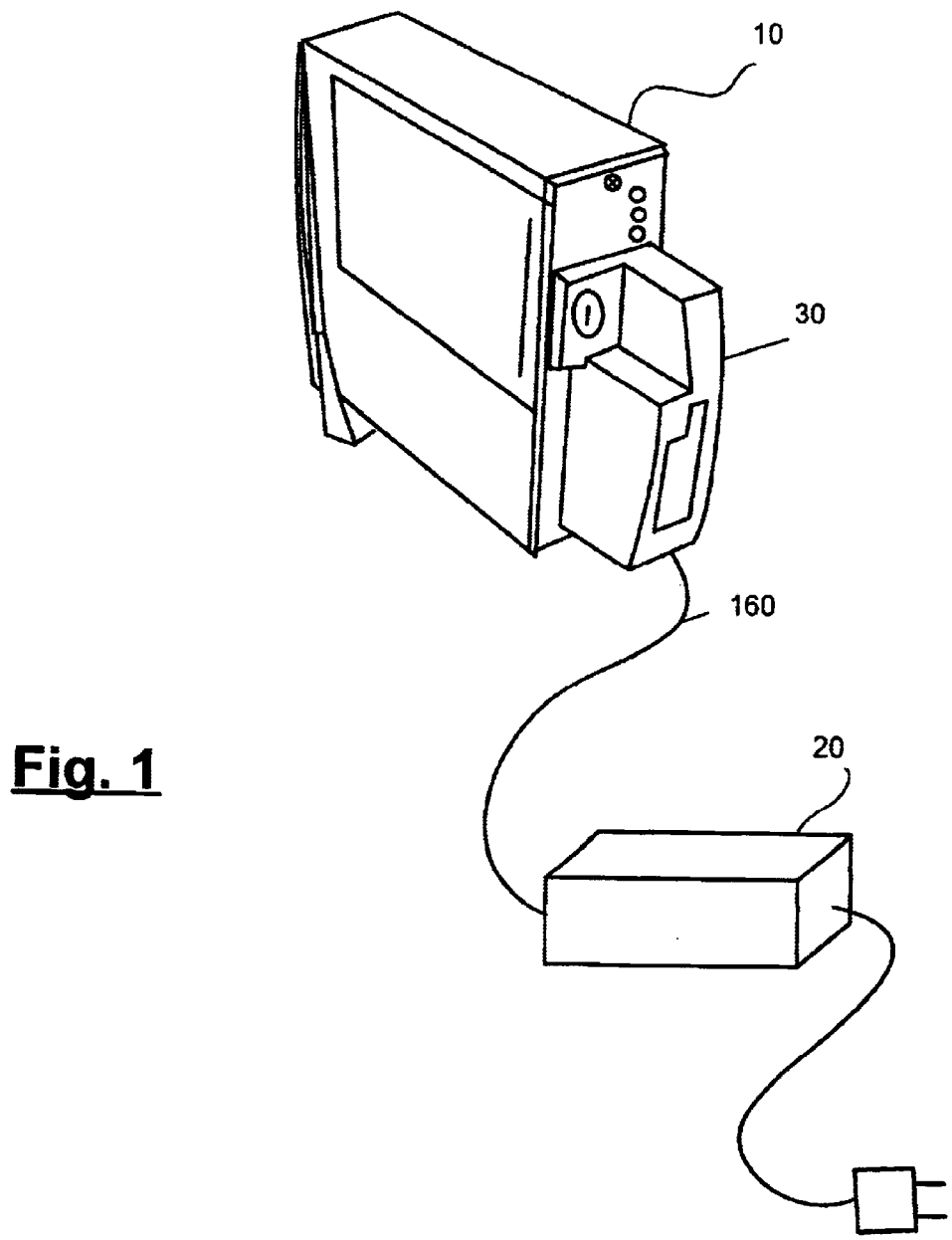

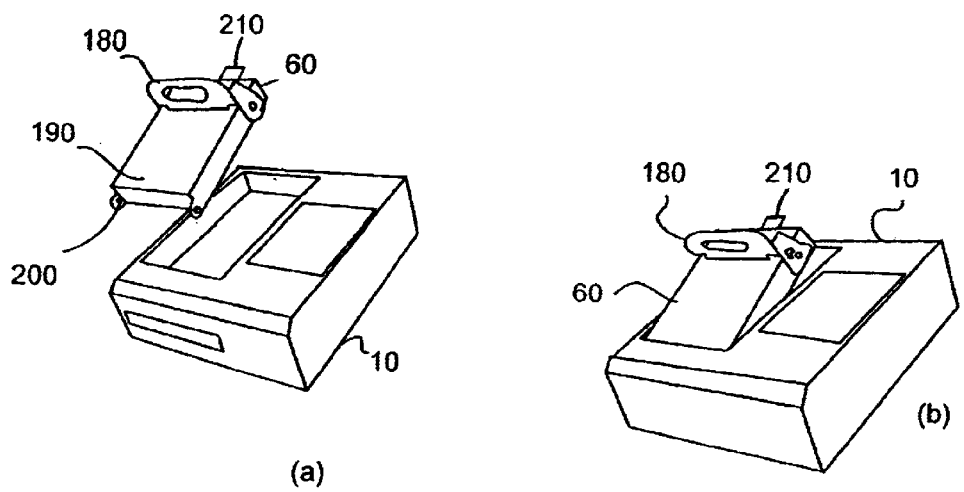
Fig. 5
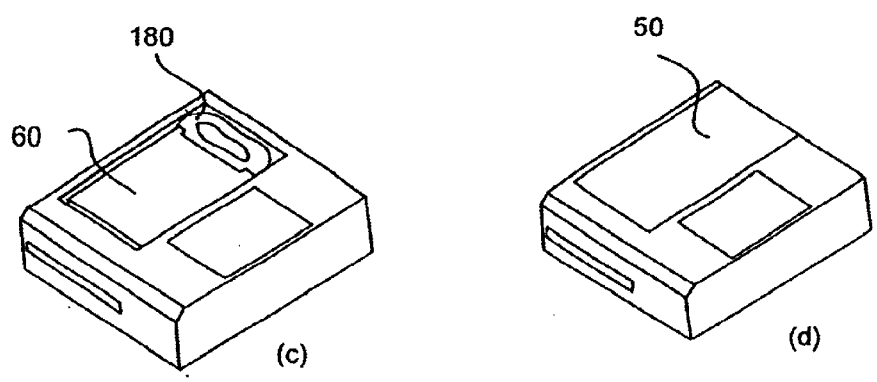

DESKTOP COMPUTER APPLIANCE

FIELD OF THE INVENTION

The invention relates to the configuration of desktop computer systems and other similar types of electronic appliances.

BACKGROUND OF THE INVENTION

The popularity of personal computers has become such that their use is an everyday occurrence for much of the world's population. Whilst improvements have been, and continue to be, made to the user interfaces of personal computers in order to make them usable by a wider cross section of the population, personal computer systems themselves have also greatly increased in their internal complexity so hat today most users are unfamiliar with the internal design and configuration of the computers that they use.

This, together with the increasingly ubiquitous nature of the Internet infrastructure and the services that are becoming available using it, is leading to the deployment of simpler, specialized computing devices that allow users to access applications at all times and on demand.

In consequence, research and development efforts relating to personal computer design are being directed to changing the nature of the desktop computer, at least fox some applications, from being a Relatively complex, but flexible, assembly of interoperating components, such as processor, memory, sound subsystem, CD-ROM drive, network card etc, each having distinct functions, parameters and features to becoming a single, network-connected and relatively reliable appliance, more akin to a telephone or television set than a microcomputer, whose internal make-up and functioning is completely invisible and irrelevant to the user.

The overall objective of such efforts is to remove complexity from the hands of the user in order to enable, ultimately, a more productive use of the technology by allowing users to focus on the task at hand rather than the tool itself.

Whilst this, at first sight, may seem a relatively straightforward and routine matter it does present some significant design challenges.

For instance, a major source of complexity, and also of much unreliability, in known systems is the expandability and upgradeabllity of the systems. The existence of standard electrical and mechanical interfaces to option cards and disk drive units means that the user of a system has many ways in which they can change the features of the system by adding or upgrading components. A consequence of this is that the standard platform chat the user receives usually has to be designed so that it will work reliably with all the possible upgrade possibilities a user might reasonably choose to install.

However, if the possibilities for expansion are limited a choice has to be made as to which features the product must have as standard features and which features should be optional.

SUMMARY OF THE INVENTION

The present invention addresses the above problems by providing a desktop personal computer appliance for use with external user input and display devices. In at least a preferred embodiment, the appliance consists of: a sealed housing comprising main processing functionality for executing application programs, and at least a DC—DC converter, the housing being provided with external connectors for connection to said external user input and display devices; a removable data storage device for storing user data associated said application programs and a user-specific software image, the housing having a recessed portion for receiving the removable data storage device and a movable closure member for enclosing the recessed portion; and an external power supply having a flying lead connectable to an external socket provided in the housing for supplying DC power to the DC—DC converter.

It can therefore be seen that the appliance is made up of three units—the sealed housing and its contents, the removable data storage unit and the external power supply. This simplifies considerably the task of providing maintenance and warranty support for such systems, thereby indirectly reducing their overall cost. The three units can be considered each to be separate field replaceable units, that are simply replaced when defective.

The housing is sealed in the sense that it is not intended that a user need to open the housing during the life of the product. If the product fails, then the housing together with its contents is replaced in its entirety. No expansion slot, socket or capability of any kind is provided within the housing, so a user does not need to open the housing for these purposes.

The use of a sealed housing has the advantage that no expandability needs to be accounted for in the design of the housing. The cooling and power consumption requirements of the components that are contained in the housing are therefore reduced and well defined. This in turn means that an external power supply can be employed, further reducing the need for cooling within the housing as well as the footprint and overall size of the housing itself.

In preferred embodiments, an arrangement is provided for securing the flying lead in its the external socket to avoid accidental disconnection thereof. The securing arrangement can, for instance, comprises a cable shroud that is movable to and from a closed position in which closed position the cable shroud is disposed so as to prevent removal of a plug on the flying lead from the socket, and a lock mechanism for locking the cable shroud in the closed position.

The appliance is provided with a removable data storage device because if it is needed to replace the system unit, the user's programs and data, being stored in removable data storage device, can easily and transparently be transferred to a replacement system unit simply by removing the device from the defective system unit and fitting the device in the replacement system unit. In a typical implementation of the invention the operating system can be stored in the removable data storage device, although the invention could also be applied to a system in which the operating system is stored in ROM, for instance, within the system unit.

Hard disk drive storage devices have, of course, been used in computers for many years. With the progress of technology, the storage capacity of hard disk drive devices has increased and their size and weight decreased, and nowadays modern personal computers typically include a disc drive device fixed inside their casing. Such drives are generally of a standard form factor and provided with fixing holes in standard positions. Whatever the form or make of the drive, it then becomes possible for a computer manufacturer to provide a standard mounting arrangement having fixing holes through which self-tapping screws can be inserted to engage in the holes in the side faces of the drive. Since the size and weight of the device has reduced, a handle is not usually provided.

Whilst screw mounting the device within the chassis is possibly the most common way of mounting the device, many other types of mounting arrangements for disk drives have been used and proposed. Although the device can be removed from the computer by opening the casing and dismounting the device, this operation is somewhat time consuming and generally needs to be carried out by a technician or at least by a user having some technical skills and knowledge, and often requires the use of tools.

Hard disk drive units that are more readily removable for the computer system are also used for certain applications such as where devices need to be removed for secure physical storage, or in multiple drive systems in which faulty drives need to be replaced whilst the system is in operation, and in mobile and portable computers. However, readily removable hard disk drives have not been widely used in desktop personal computers, since such computers have typically provided the possibility of adding other components within the casing and therefore have usually been designed with the assumption that the user, or the technician responsible for maintaining the computer, will need to open the casing for other reasons.

BRIEF DESCRIPTION OF THE INVENTION

Figure 2:
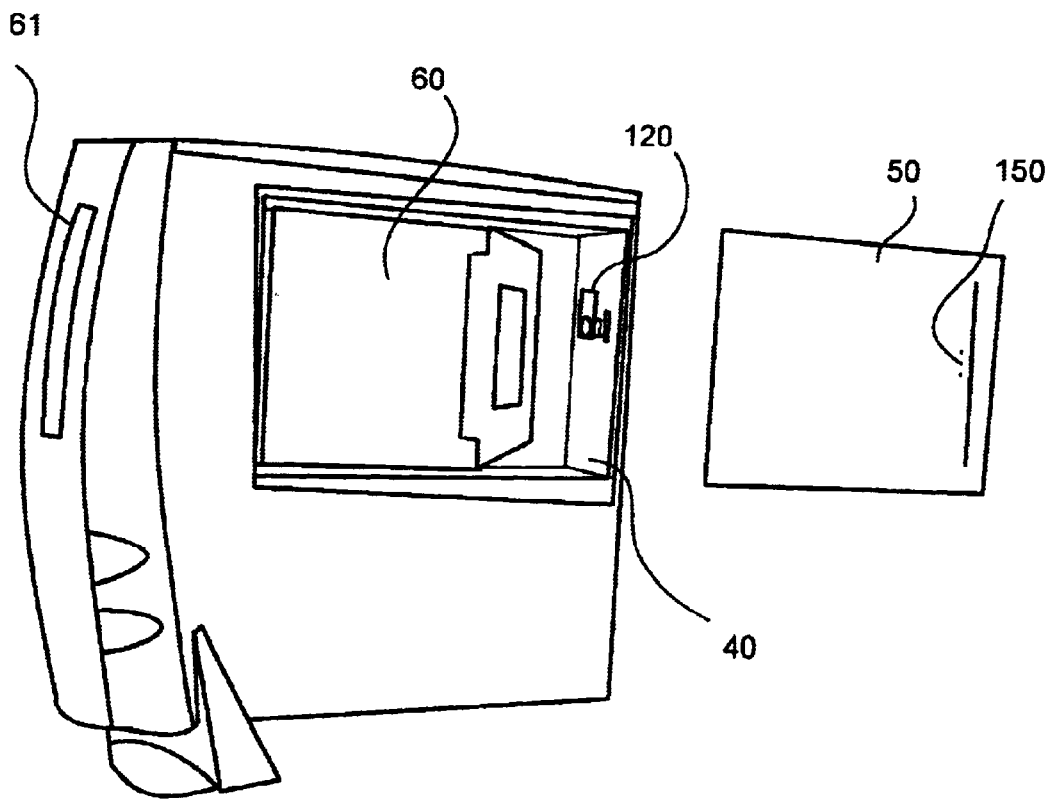
Figure 4:
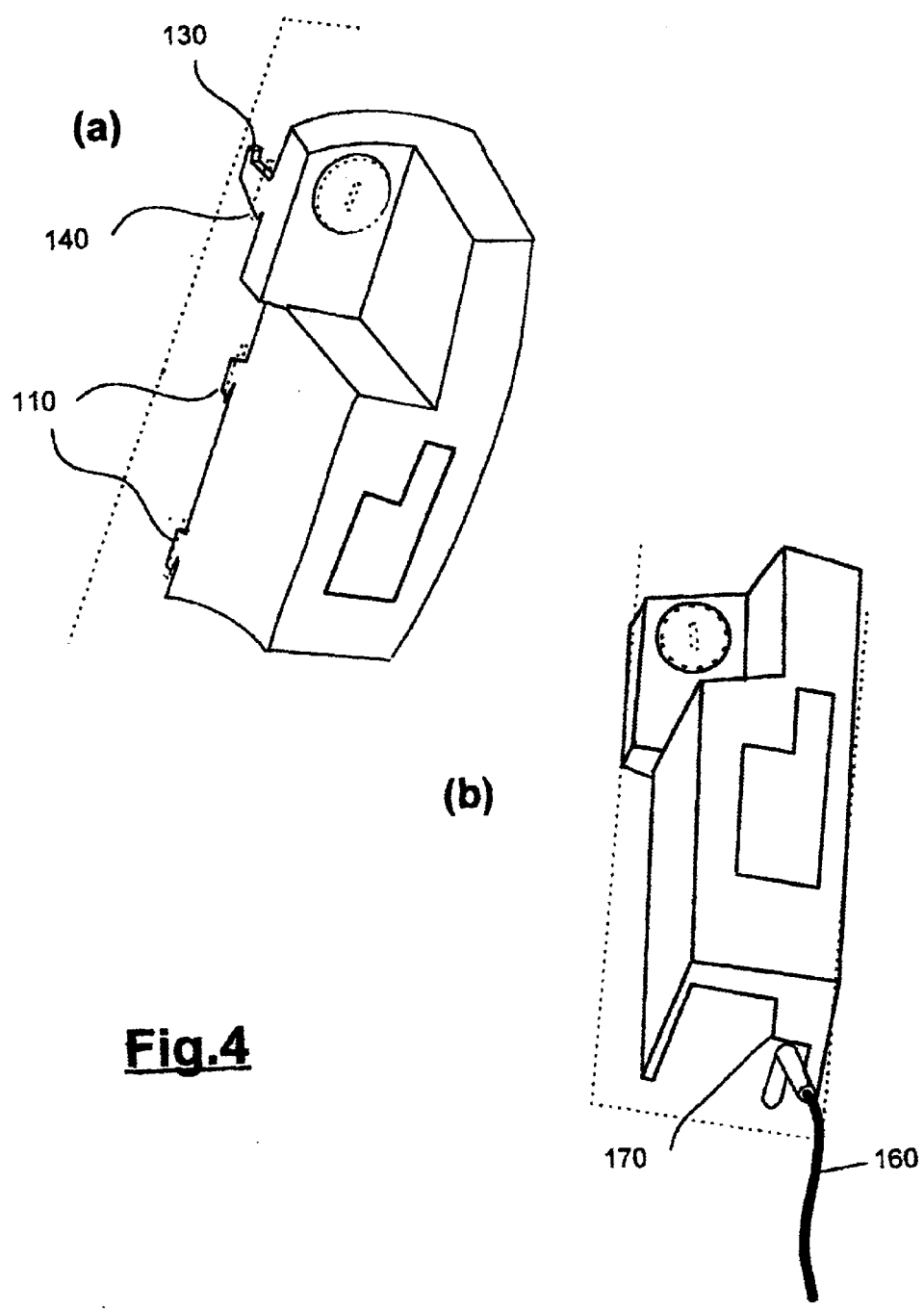

A personal computer embodying the invention will now be described, by way of non-limiting example, with reference to the accompanying drawings, in which FIG. 1 is a rear perspective view of a personal computer;

FIG. 2 shows the personal computer of FIG. 1 with a removable cover removed;

FIGS. 3(a) and 3(b) are rear views of the personal computer with and without a cable shroud in place;

FIGS. 4(a) and 4(b) are upper and lower left side perspective views of the cable shroud;

FIGS. 5(a)–5(d) show a disk drive unit in a series of positions (a) to (d) being installed in the computer.

BEST MODE OF CARRYING OUT THE INVENTION

Referring to FIG. 1, there is shown a rear perspective view of an appliance-like desktop personal computer system unit 10 having a small form factor. System unit 10 is used in conjunction with conventional keyboard, display screen and mouse devices. An external power supply unit 20 provides low-voltage DC power to the computer through a flying lead 160. External power supply unit 20 is a conventional self-contained AC adapter of the type conventionally used with portable computers. The motherboard of the computer mounted within housing 10 includes suitable DC—DC conversion circuits for generating the various voltages required by the different components of the computer.

A removable cable shroud 30 serves to secure cables plugged into sockets on the rear face of the unit as will be described in more detail below.

FIG. 2 shows the housing with the cable shroud 30 removed. As can be seen in FIG. 2, the housing of unit 10 has a recessed portion 40, closed with a sliding cover 50. Recessed portion 40 is for receiving a removable disk drive data storage device 60. Computer 10 also includes an internal CD or DVD ROM drive 61.

Apart from the removable cover 50 and disk drive unit 60, the housing of computer 10 is sealed in the sense that it is not intended to be opened by the user and represents a single field replaceable unit which is simply replaced if it fails rather than being serviced on site. All optional and accessory components are connected to the computer via flying leads through sockets to the rear of the housing. If it is needed to replace the system unit, the users programs and data, being stored in removable data storage device 60, can easily and transparently be transferred to a replacement system unit simply by removing the device 60 from the defective system unit and fitting the device in the replacement system unit.

For this reason the screws 75 that hold the housing together are provided with a tamper-evident seal that serves to indicate whether or not the caring has been opened. This seal is useful, for instance, for the purpose of determining the applicability of a warranty to the machine. The seal can take any suitable form, such as a sticker covering the screw or a patch of suitable paint over the screw.

It can therefore be seen that, excepting the keyboard, mouse, display and other optional cable-connected accessories, the system is made up of three field replaceable units—system unit 10, disk drive unit 60 and AC adapter 20. It will be appreciated that this simplifies considerably the task of providing maintenance and warranty support for such systems, thereby indirectly reducing their overall cost.

Very important to the practical usability of the unit 10 in corporate environments is cable shroud 30 that is removably fixed to the rear of the housing. Cable shroud 30 has two main functions to be described in more detail below. First, it prevents removal of plugs engaged in the sockets to the rear of the housing. Secondly, by covering and guiding cables plugged into the rear of the unit, it lends an aesthetic appearance to the rear of the computer.

The aesthetic function is all the more significant in a small form factor personal computer, since these are often located on a desktop in a customer service environment with limited space available. It a customer service representative that is using the computer is positioned so as to face a customer and use the computer at the same time, it is very likely that the customer will see the rear face of the computer and the multiplicity of cables that inevitably are plugged therein.

FIGS. 3(a) and 3(b) are rear views of the personal computer with and without cable shroud 30 in place. When in place, shroud 30 defines a number of apertures through which cables can pass freely. As can be seen in FIG. 3(a) shroud 30 guides and routes cables 70 so that they exit the shroud in a generally downward direction from a downwardly facing opening in the shroud. In addition, a rearwardly facing aperture 80 is provided to allow stiff cables, such as those used to connect to conventional video, parallel and serial ports to exit the shroud without having to be bent.

Whilst neither the cables nor their connectors are engaged directly by the shroud, the size and shape of the apertures is chosen so that the plugs on the cables must be engaged in their respective sockets before the shroud is put into position. Once the shroud is in position, the plugs cannot be removed from their sockets without cutting the cables and a plug cannot be connected to an empty socket. For the reasons explained below, this feature is particularly important for cables that connected to USB ports 90 and for the DC power cable that is used to connect power supply 20 to unit 10.

The USB (Universal Serial Bus) is a serial bus with a rate of data transmission fast enough to support a variety of devices, including keyboards, mice, joysticks, printers, scanners, speakers, and floppy disk drives USB is intended to replace the current array of keyboard, serial, and parallel connections using an industry standardized communications protocol. One USB feature, "hot-plugging," lets users attach or remove a peripheral device without having to shut down or restart their PC. No special software drivers need to be added or installed; The PC automatically detects the peripheral device and configures the necessary software.

Whilst this feature is generally very useful it does pose a security problem. First, it is expected that higher value devices, such as printers, scanners, digital cameras, and personal digital assistants, mobile telephones or other forms of mobile appliances will be attached to the computer system by such connections. Secondly, the Automatic configuration of the bus allows some devices access to the data stored within the computer without having to have access to the user interface of the operating system (which can be password protected in a user's absence). For the above reasons, it is important both to prevent removal of USA devices that are already attached to the computer and also unauthorised attachment of USB devices to the computer. Of course, the same factors may apply to other types of 'plug and play' buses depending upon the security features established in the bus standards themselves.

Due to the use of an external power supply, unit 10 is particularly vulnerable to accidental removal of the DC power cable 160 because, unlike a portable computer, it does not contain an internal battery that would provide power in the event of accidental disconnection of the power cord and thereby prevent data loss or corruption. As is standard with such AC adapters, DC power cable 160 is provided with a male connector that is inserted into a corresponding female connector 100 and held in place by frictional forces only. Unfortunately, the frictional force is often insufficient to hold the two connectors in place, and if the unit is inadvertently bumped or jostled, lose of power may result if the two connectors become disconnected from one another.

Shroud 30 also covers and protects a hardware reset switch 91 located on the rear of the housing.

FIGS. 4(a) and 4(b) are upper and lower left side perspective views of the cable shroud. Shroud 30 has a generally open cuboid form with four closed faces that define a cavity and two adjacent open faces. As can be seen in FIG. 4(a), shroud 30 carries four hook members 110 that engage with corresponding slots in the rear face of the housing.

A key operated lock 35, that is supported on the unit 10, locks the cable shroud into position on the rear of the housing by moving a rotatable lock arm 120 (shown in FIG. 2) into engagement with a longer hook member 130 that passes through a further slot 140 in the rear face of unit 10. When lock arm 120 is engaged with hook member 130, shroud 30 cannot be removed. A portion of the cavity is inset and provided with an opening through which the barrel of the lock protrudes when the shroud is fixed in place to allow access to the keyhole.

In this embodiment the lock system is the so called 'master pass key' lock system used for instance in the HP Vectra series of computers and described in the document "HP D6655A, HP 6659A Master Pass Key System User's Guide" available from Hewlett-Packard Company. This is a mechanism similar to a conventional key operated lock, except that two people are enabled to unlock the machine: the key owner and the system manager. The system manager can open all machines that he is responsible for using a programmable master key.

Lock arm 120 also serves to lock cover 50 in place by engaging with a suitably shaped projection 150—shown in phantom in FIG. 2—on the inside of cover 50. In this way, unauthorised removal of disk drive 60 is prevented.

FIG. 4b illustrates how shroud 30 is shaped to prevent removal of DC power cord 160. Cord 160 is provided with a right angle male connector that is held in place in a female socket by a frictional force. Shroud 30 has an edge 170 that prevents the removal of the right angle connector from its socket when shroud 30 is fixed in place.

Figure 3:
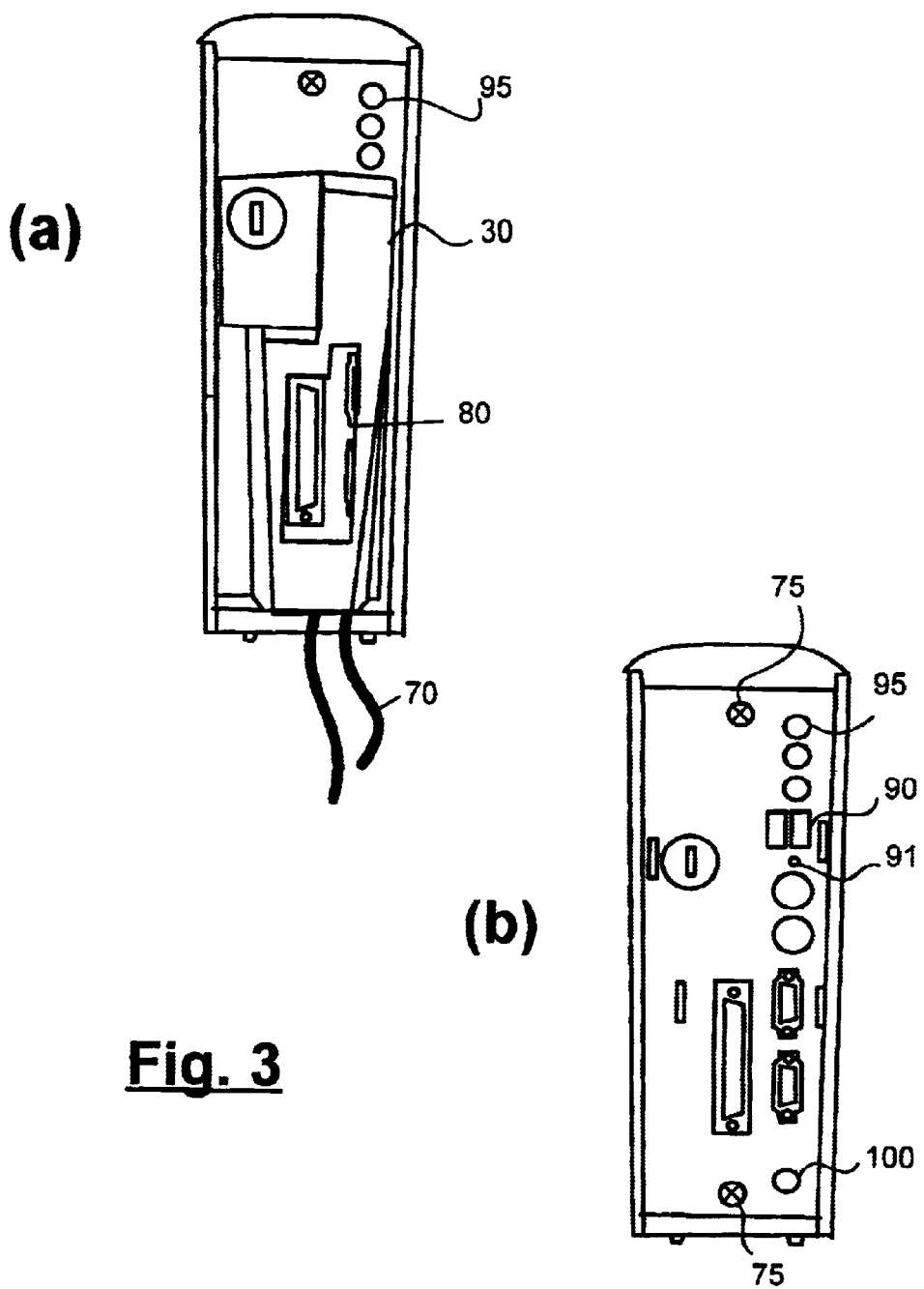

As can be seen in FIG. 3, certain connectors such as connector 95 are located outside the cable shroud and are not protected by it. Such connectors would be, for instance, audio connectors that might require frequent connection and disconnection of headphones, microphones and the like according to the application for which the unit has been designed.

FIGS. 5(a)–5(d) show disk drive unit 60, in a series of positions (a) to (a), being installed in the computer. As can be seen in FIG. 5(a), unit 20 is provided with a U-shaped handle 180 with side arms pivotally mounted on respective opposing sides of unit 60. Handle 180 is lifted and pulled upwards in order to remove unit 60 from recess 40.

Recess 40 is provided with suitable shaped guiding and retaining pockets (not shown) on its oppositely facing inner walls. These pockets locate and retain a first end 190 of unit 60, the unit being provided with laterally extending mounting studs 200 for engaging the pockets and, once engaged, for enabling unit 60 to pivot and slide into the position shown in FIG. 5(c) which is its operational position.

The other end of unit 60 is provided with a connector 210 positioned to enable a flying lead to be conveniently connected manually to the unit with the studs 200 engaged in the pockets and the unit nut fully pivoted into ints operational position. This intermediate position is generally shown in FIG. 5(b).

The removable unit 60 comprises a mounting tray within which a hard disk drive of standard 3.3' form factor is shock mounted so as to present its electrical connector at an opening in one end of the tray, the mounting studs 200 and handle 180 being provided on the mounting tray.

Although a specific embodiment of the invention has been described, the invention is not to be limited to the specific arrangement so described. The invention is limited only by the claims. The claims themselves are intended to indicate the periphery of the claimed invention and are intended to be interpreted as broadly as the language itself allows, rather than being interpreted as claiming only the exemplary embodiment disclosed by the specification.

What is claimed is:

1. A desktop personal computer appliance for use with external user input and display devices, the appliance comprising:

a displayless and keyboardless system unit having a sealed housing comprising main processing functionality for executing application programs and at least a DC—DC converter, the housing being provided with external connectors for connection to said external user input and display devices;

a removable data storage device for storing user data associated with said application programs and a user-specific software image containing said application programs, the housing having a recessed portion for receiving the removable data storage device and a movable closure member for enclosing the recessed portion, an external power supply having a flying lead connectable to an external socket provided in the housing for supplying DC power to the DC—DC converter, and a mounting arrangement for the removable data storage device, the mounting arrangement comprising retaining pockets on oppositely facing inner walls of the recessed portion for receiving mounting studs extending laterally from the removable data storage unit, the pockets and studs, once engaged, enabling the unit to pivot about a first axis into an operational position within the recess, and a handle mounted on the unit so as to be rotatable about an axis parallel to the first axis, wherein the housing comprises a sliding closure for closing the recess.

2. An appliance as claimed in claim 1 wherein the software image includes an operating system.

3. An appliance as claimed in claim 1 comprising an arrangement for securing the flying lead in the external socket to avoid accidental disconnection thereof.

4. An appliance as claimed in claim 3 wherein the securing arrangement comprises a cable shroud that is movable to and from a closed position in which closed position the cable shroud is disposed so as to prevent removal of a plug on the flying lead from the socket, and a lock mechanism for locking the cable shroud in the closed position.

5. An appliance as claimed in claim 1 wherein the end of the unit remote from said first end comprises a connector positioned to enable a flying lead to be manually connected thereto with the studs engaged in the pockets and the unit not fully pivoted into the operational position.

6. An appliance as claimed in claim 1 wherein in the closed position the handle lies flush with a surface of the removable unit that is parallel to and facing the opening of the recessed portion.

7. An appliance as claimed in claim 1 wherein the handle is substantially U shaped with side arms pivotally mounted on respective opposing sides of the unit.

8. An appliance as claimed in claim 1 wherein the removable unit comprises a mounting tray within which a standard form factor disk drive unit is shock mounted, the mounting studs and handle being provided on the mounting tray.

9. A desktop personal computer appliance for use with external user input and display devices, the appliance comprising:

a system unit having a sealed housing comprising main processing functionality for executing application programs and at least a DC—DC converter, the housing being provided with external connectors for connection to said external user input and display devices;

a removable data storage device for storing user data associated with said application programs and a user-specific software image containing said application programs;

the housing having a recessed portion for receiving the removable data storage device and a movable closure member for enclosing the recessed poriton;

an external power supply having a flying lead connectable to an external socket provided in the housing for supplying DC power to the DC—DC converter; and a mounting arrangement for the removable data storage device comprising retaining pockets on oppositely facing inner walls of the recessed portion for receiving mounting studs extending laterally from the removable data storage unit, the pockets and studs, once engaged, enabling the unit to pivot about a first axis into an operational position within the recess, and a handle mounted on the unit so as to be rotatable about an axis parallel to the first axis, wherein the end of the unit remote from said first end comprises a connector positioned to enable a flying lead to be manually connected thereto with the studs engaged in the pockets and the unit not fully pivoted into the operational position.

10. An appliance as claimed in claim 9 wherein in the closed position the handle lies flush with a surface of the removable unit that is parallel to and facing the opening of the recessed portion.

11. An appliance as claimed in claim 9 wherein the handle is substantially U shaped with side arms pivotally mounted on respective opposing sides of the unit.

12. An appliance as claimed in claim 9 wherein the software image includes an operating system.

13. An appliance as claimed in claim 9, further comprising an arrangement for securing the flying lead in the external socket to avoid accidental disconnection thereof.

14. An appliance as claimed in claim 13 wherein the securing arrangement comprises a cable shroud that is movable to and from a closed position in which closed position the cable shroud is disposed so as to prevent removal of a plug on the flying lead from the socket, and a lock mechanism for locking the able shroud in the closed position.

15. An appliance as claimed in claim 9 wherein the housing comprises a sliding closure for closing the recess.

16. An appliance as claimed in claim 9 wherein the removable unit comprises a mounting tray within which a standard form factor disk drive unit is shock mounted, the mounting studs and handle being provided on the mounting tray.

* * * * *